US006775985B2

(12) United States Patent
Mitchell et al.

(10) Patent No.: US 6,775,985 B2
(45) Date of Patent: Aug. 17, 2004

(54) SUPPORT ASSEMBLY FOR A GAS TURBINE ENGINE COMBUSTOR

(75) Inventors: Krista Anne Mitchell, Springboro, OH (US); David Edward Bulman, Cincinnati, OH (US); Mark Eugene Noe, Morrow, OH (US); Harold Ray Hansel, Mason, OH (US); Christopher Charles Glynn, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 65 days.

(21) Appl. No.: 10/342,040

(22) Filed: Jan. 14, 2003

(65) Prior Publication Data

US 2004/0134198 A1 Jul. 15, 2004

(51) Int. Cl.[7] .................................................. F02C 1/00
(52) U.S. Cl. .............................. 60/772; 60/796; 60/800
(58) Field of Search .......................... 60/772, 796, 800, 60/805, 722

(56) References Cited

U.S. PATENT DOCUMENTS

| | | | | |
|---|---|---|---|---|
| 5,181,377 A | * | 1/1993 | Napoli et al. | 60/796 |
| 5,285,632 A | | 2/1994 | Halila | 60/39.31 |
| 5,291,732 A | | 3/1994 | Halila | 60/39.31 |
| 5,291,733 A | | 3/1994 | Halila | 60/39.31 |
| 5,353,587 A | | 10/1994 | Halila | 60/39.37 |
| 5,363,643 A | | 11/1994 | Halila | 60/39.31 |
| 5,592,814 A | | 1/1997 | Palusis et al. | 60/271 |
| 5,701,733 A | * | 12/1997 | Lewis et al. | 60/796 |
| 6,397,603 B1 | | 6/2002 | Edmondson et al. | 60/753 |
| 6,658,853 B2 | * | 12/2003 | Matsuda et al. | 60/753 |
| 6,668,559 B2 | * | 12/2003 | Calvez et al. | 60/796 |
| 2002/0108378 A1 | | 8/2002 | Ariyoshi et al. | |

OTHER PUBLICATIONS

"ESPR Combustor Concept," Kawasaki Industries, Ltd. (Mar. 2000), Cover sheet and figure (partially screened).

Hiroyuki Ninomiya et al., "Development of Low NOx LPP Combustor," The First International Symposium of Environmentally Compatible Propulsion System for Next–Generation Supersonic Transport, Tokyo, Japan (May 21–22, 2002), p. 1–6.

* cited by examiner

*Primary Examiner*—Charles G. Freay
(74) *Attorney, Agent, or Firm*—William Scott Andes; James P. Davidson

(57) ABSTRACT

A support assembly for a gas turbine engine combustor including an inner liner and an inner casing spaced therefrom, wherein a longitudinal centerline axis extends through the gas turbine engine. The support assembly includes an annular inner support cone located adjacent an aft end of said inner liner, an annular nozzle support connected to the inner support cone, and a plurality of support members connected at a first end to a forward end of the inner liner and connected at a second end to the inner support cone.

29 Claims, 4 Drawing Sheets

SUPPORT ASSEMBLY FOR A GAS TURBINE ENGINE COMBUSTOR

STATEMENT REGARDING FEDERALLY SPONSORED RESEARCH AND DEVELOPMENT

The U.S. Government may have certain rights in this invention pursuant to contract number NAS3-27720.

BACKGROUND OF THE INVENTION

The present invention relates generally to the use of Ceramic Matrix Composite liners in a gas turbine engine combustor and, in particular, to the damping of vibrations experienced by the combustor.

It will be appreciated that the use of non-traditional high temperature materials, such as Ceramic Matrix Composites (CMC), are being studied and utilized as structural components in gas turbine engines. There is particular interest, for example, in making combustor components which are exposed to extreme temperatures from such material in order to improve the operational capability and durability of the engine. As explained in U.S. Pat. No. 6,397,603 to Edmondson et al., substitution of materials having higher temperature capabilities than metals has been difficult in light of the widely disparate coefficients of thermal expansion when different materials are used in adjacent components of the combustor. This can result in a shortening of the life cycle of the components due to thermally induced stresses, particularly when there are rapid temperature fluctuations which can also result in thermal shock.

Accordingly, various schemes have been employed to address problems that are associated with mating parts having differing thermal expansion properties. As seen in U.S. Pat. No. 5,291,732 to Halila, U.S. Pat. No. 5,291,733 to Halila, and U.S. Pat. No. 5,285,632 to Halila, an arrangement is disclosed which permits a metal heat shield to be mounted to a liner made of CMC so that radial expansion therebetween is accommodated. This involves positioning a plurality of circumferentially spaced mount pins through openings in the heat shield and liner so that the liner is able to move relative to the heat shield.

U.S. Pat. No. 6,397,603 to Edmondson et al. also discloses a combustor having a liner made of Ceramic Matrix Composite materials, where the liner is mated with an intermediate liner dome support member in order to accommodate differential thermal expansion without undue stress on the liner. The Edmondson et al. patent further includes the ability to regulate part of the cooling air flow through the interface joint.

Another concern with the implementation of CMC liners is reducing the amount of vibration experienced by such combustor. It has been learned that replacing traditional metal liners with CMC liners causes the vibration response of the combustor to drop into the operating range of the engine. This appears to stem from the radially free manner of mounting the liners at a forward end, as described in a patent application entitled "Mounting Assembly For The Forward End Of A Ceramic Matrix Composite Liner In A Gas Turbine Engine Combustor," having Ser. No. 10/324,871 and being owned by the assignee of the present invention, as well as the radially free manner of mounting the liners at an aft end, as described in a patent application entitled "Mounting Assembly For The Aft End Of A Ceramic Matrix Composite Liner For A Gas Turbine Engine Combustor," having Ser. No. 10/326,209 and being owned by the assignee of the present invention.

Accordingly, it would be desirable for a support member to be developed for use with a combustor having a CMC liner, where such support member is able to stiffen the combustor and increase the frequency out of the operating range of the engine. It is also desirable for the support member to have a geometry which minimizes blockage of air flow.

BRIEF SUMMARY OF THE INVENTION

In accordance with a first exemplary embodiment of the invention, a support assembly for a gas turbine engine combustor including an inner liner and an inner casing spaced therefrom is disclosed, wherein a longitudinal centerline axis extends through the gas turbine engine. The support assembly includes an annular inner support cone located adjacent an aft end of said inner liner, an annular nozzle support connected to the inner support cone, and a plurality of support members connected at a first end to a forward end of the inner liner and connected at a second end to the inner support cone.

In accordance with a second exemplary embodiment of the invention, a combustor for a gas turbine engine having a longitudinal centerline axis extending therethrough is disclosed as including: an inner liner having a forward end and an aft end, where the inner liner is made of a ceramic matrix composite material; an inner casing spaced from the inner liner so as to form an inner passage therebetween; an annular inner support cone located adjacent to the inner liner aft end, where the inner support cone is made of a metal; and, a plurality of circumferentially spaced support members connected at a first end to the inner liner forward end and connected at a second end to the annular inner support cone. In this way, the support members provide additional stiffness to the combustor and cause the vibrations experienced by the combustor to be outside the operating frequency of the gas turbine engine.

In accordance with a third embodiment of the invention, a method of providing additional stiffness to a gas turbine engine combustor is disclosed, wherein an inner liner of the combustor is connected at a forward end and at an aft end in a manner permitting radial movement. The method includes the steps of movably connecting a plurality of support members at a forward portion to a forward end of the inner liner and fixedly connecting the support members at an aft portion to an annular inner support cone. Additional steps of the method may include fixedly connecting the support members at a forward portion to a dome and/or an inner cowl of the combustor.

DETAILED DESCRIPTION OF THE INVENTION

Figure 1:
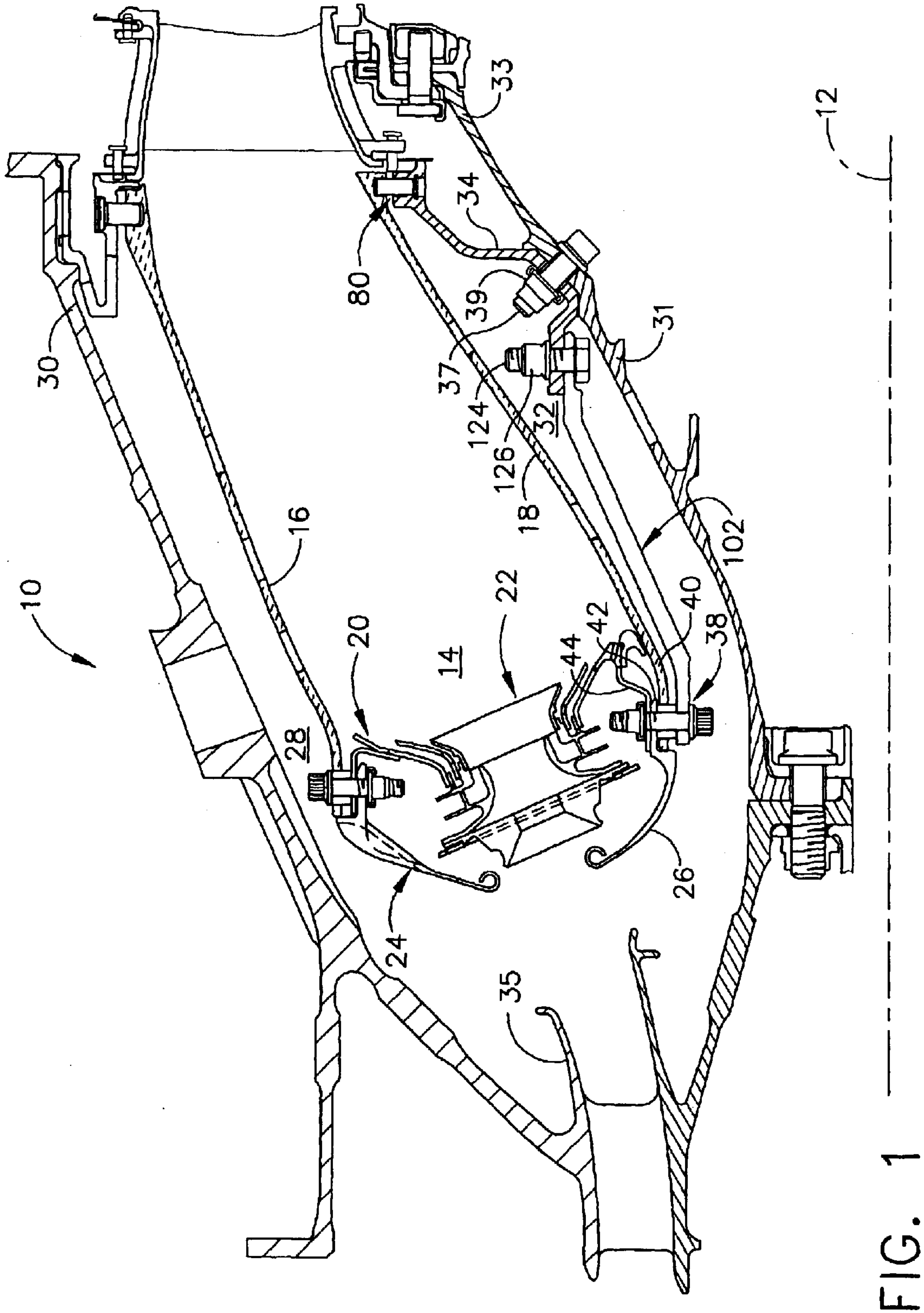
FIG. 1 is a longitudinal cross-sectional view of a gas turbine engine combustor having an inner liner and an outer liner made of ceramic matrix composite and including a support member in accordance with the present invention.

Referring now to the drawings in detail, wherein identical numerals indicate the same elements throughout the figures, FIG. 1 depicts an exemplary gas turbine engine combustor 10 which conventionally generates combustion gases that are discharged therefrom and channeled to one or more pressure turbines. Such turbine(s) drive one or more pressure compressors upstream of combustor 10 through suitable shaft(s). A longitudinal or axial centerline axis 12 is provided through the gas turbine engine for reference purposes.

It will be seen that combustor 10 further includes a combustion chamber 14 defined by an outer liner 16, an inner liner 18 and a dome 20. Combustor dome 20 is shown as being single annular in design so that a single circumferential row of fuel/air mixers 22 are provided within openings formed in such dome 20, although a multiple annular dome may be utilized. A fuel nozzle (not shown) provides fuel to fuel/air mixers 22 in accordance with desired performance of combustor 10 at various engine operating states. It will also be noted that an outer annular cowl 24 and an inner annular cowl 26 are located upstream of combustion chamber 14 so as to direct air flow into fuel/air mixers 22, as well as an outer passage 28 between outer liner 16 and an outer casing 30 and an inner passage 32 between inner liner 18 and an inner casing 31. An inner annular support member 34, also known herein as an inner support cone, is further shown as being connected to a nozzle support 33 by means of a plurality of bolts 37 and nuts 39. In this way, convective cooling air is provided to the outer surfaces of outer and inner liners 16 and 18 and air for film cooling is provided to the inner surfaces of such liners. A diffuser 35 receives the air flow from the compressor(s) and provides it to combustor 10.

It will be appreciated that outer and inner liners 16 and 18 are preferably made of a ceramic matrix composite (CMC), which is a non-metallic material having high temperature capability and low ductility. Exemplary composite materials utilized for such liners include silicon carbide, silicon, silica or alumina matrix materials and combinations thereof. Typically, ceramic fibers are embedded within the matrix such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y and combinations thereof) and inorganic fillers (e.g., pyrophyllite, wollastonite, mica, talc, kyanite and montmorillonite). CMC materials typically have coefficients of thermal expansion in the range of about $1.3\times10^{-6}$ in/in/° F. to about $3.5\times10^{-6}$ in/in/° F. in a temperature range of approximately 1000–1200° F.

By contrast, inner casing 31, nozzle support 33, and inner support cone 34 are typically made of a metal, such as a nickel-based superalloy (having a coefficient of thermal expansion of about $8.3\text{–}8.6\times10^{-6}$ in/in/° F. in a temperature range of approximately 1000–1200° F.). Thus, liners 16 and 18 are better able to handle the extreme temperature environment presented in combustion chamber 14 due to the materials utilized therefor, but attaching them to the different materials utilized for dome 20, cowls 24 and 26 and inner support cone 34 presents a separate challenge.

Figure 2:
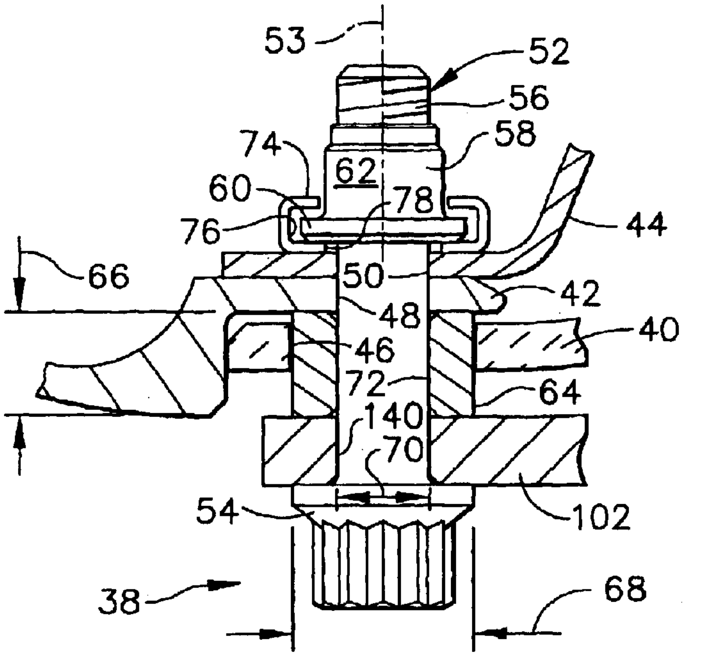
FIG. 2 is an enlarged, partial cross-sectional view of the combustor depicted in FIG. 1, where a mounting assembly for a forward end of the inner liner is shown.

As seen in FIGS. 1 and 2, and described in the aforementioned patent application having Ser. No. 10/324,871, it will be understood that that a mounting assembly 38 is provided for a forward end 40 of inner liner 18, an aft portion 42 of inner cowl 26, and an inner portion 44 of dome 20 so as to accommodate differences in thermal growth experienced by such components. More specifically, it will be understood that inner liner forward end 40, inner cowl aft portion 42 and dome inner portion 44 each include a plurality of circumferentially spaced openings 46, 48 and 50, respectively, which are positioned so as to be in alignment.

A pin member 52 preferably extends through each set of aligned openings and includes a head portion 54 at a first end thereof. Pin members 52 preferably include threads 56 formed thereon so that a nut 58 is adjustably connected to a second end of each pin member 52 opposite head portion 54. It will be noted that each nut 58 preferably includes a flange portion 60 extending from an outer surface 62 thereof. A bushing 64 is also preferably located on each pin member 52 and fixed at a position intermediate head portion 54 and nut 58 between head portion 54 and inner cowl aft portion 42. In this way, nuts 58 and head portions 54 fixedly connect together inner cowl aft portion 42, dome inner portion 44 and bushings 64. It will be understood that while inner cowl aft portion 42 is located between dome inner portion 44 and bushings 64, combustor 10 could be configured so that dome inner portion 44 is located between inner cowl aft portion 42 and bushings 64.

Openings 46 in inner liner forward end 40 are preferably sized, however, so that bushings 64 are able to slide radially therethrough as inner cowl aft portion 42 and dome inner portion 44 experience thermal growth greater than inner liner forward end 40. Thus, inner cowl aft portion 42 and dome inner portion 44 are able to move between a first radial position and a second radial position. As seen in the figures, a height 66 of bushings 64 should be sized great enough to accommodate the radial thermal growth of inner cowl aft portion 42 and dome inner portion 44. In order to provide the clamping of bushings 64 with inner cowl aft portion 42 and dome inner portion 44, however, pin head portion 54 will have a diameter 68 greater than a diameter 70 of an opening 72 in bushings 64.

It is preferred that inner cowl aft portion 42 and dome inner portion 44 not be able to move axially or circumferentially with respect to inner liner forward end 40. Accordingly, an annular member 74 having a channel 76 formed therein is provided adjacent dome inner portion 44. A plurality of circumferentially spaced openings 78 are formed in annular member 74 which are aligned with openings 46 in inner liner forward end 40, openings 48 in inner cowl aft portion 42 and openings 50 in dome inner portion 44. Nuts 58 are then positioned so that flange portions 60 thereof are located within channel 76 and fixedly connect bushings 64, inner cowl aft portion 42, dome inner portion 44 and annular member 74.

Figure 3:
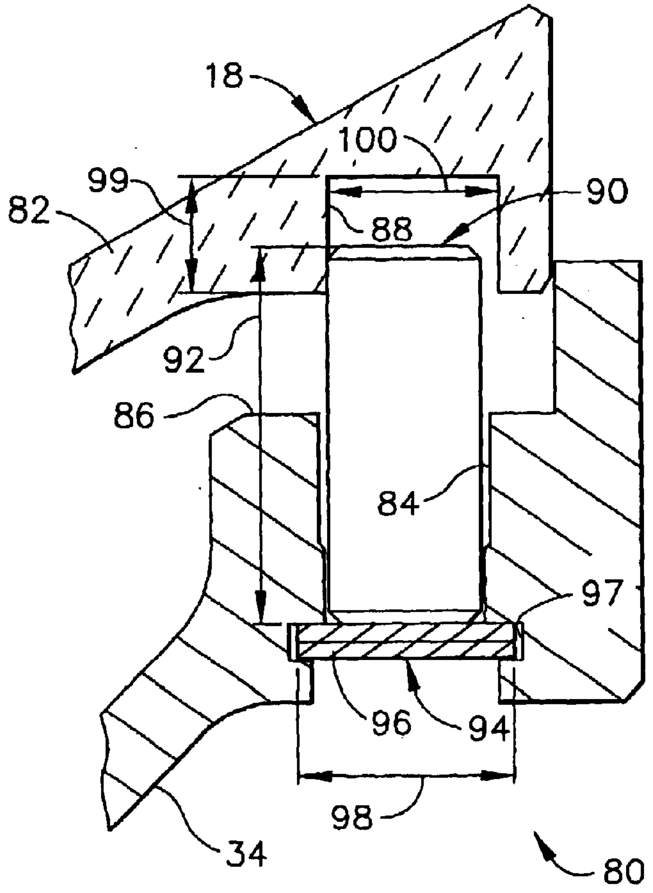
FIG. 3 is an enlarged, partial cross-sectional view of the combustor depicted in FIG. 1, where a mounting assembly for an aft end of the inner liner is shown.

It will also be noted from FIGS. 1 and 3 that a mounting assembly 80 is provided for an aft end 82 of inner liner 18 and inner support cone 34 which accommodates varying thermal growth experienced by such components. It will be appreciated that mounting assembly 80 shown in FIG. 3 is prior to any thermal growth experienced by inner liner 18, inner support cone 34 and possibly nozzle support 33. More specifically, it will be understood that inner support cone 34 has a plurality of circumferentially spaced openings 84 formed in a portion 86 thereof and inner liner aft end 82, which has an increased thickness, preferably includes a plurality of circumferentially spaced partial openings or holes 88 formed therein which are positioned so as to be in alignment with openings 84. A pin member 90 preferably extends through each opening 84 and is received in a corresponding partial opening 88 in inner liner aft end 82. Pin members 90 may each include a head portion at one end thereof. In such case, openings 84 may include a portion which is either chamfered or otherwise has an enlarged diameter so as to better receive such head portion of pin members 90. Further, the location and/or depth of such portion may also be utilized to verify that pin members 90 are properly positioned within partial openings 88 of inner liner aft end 82.

Figure 5:
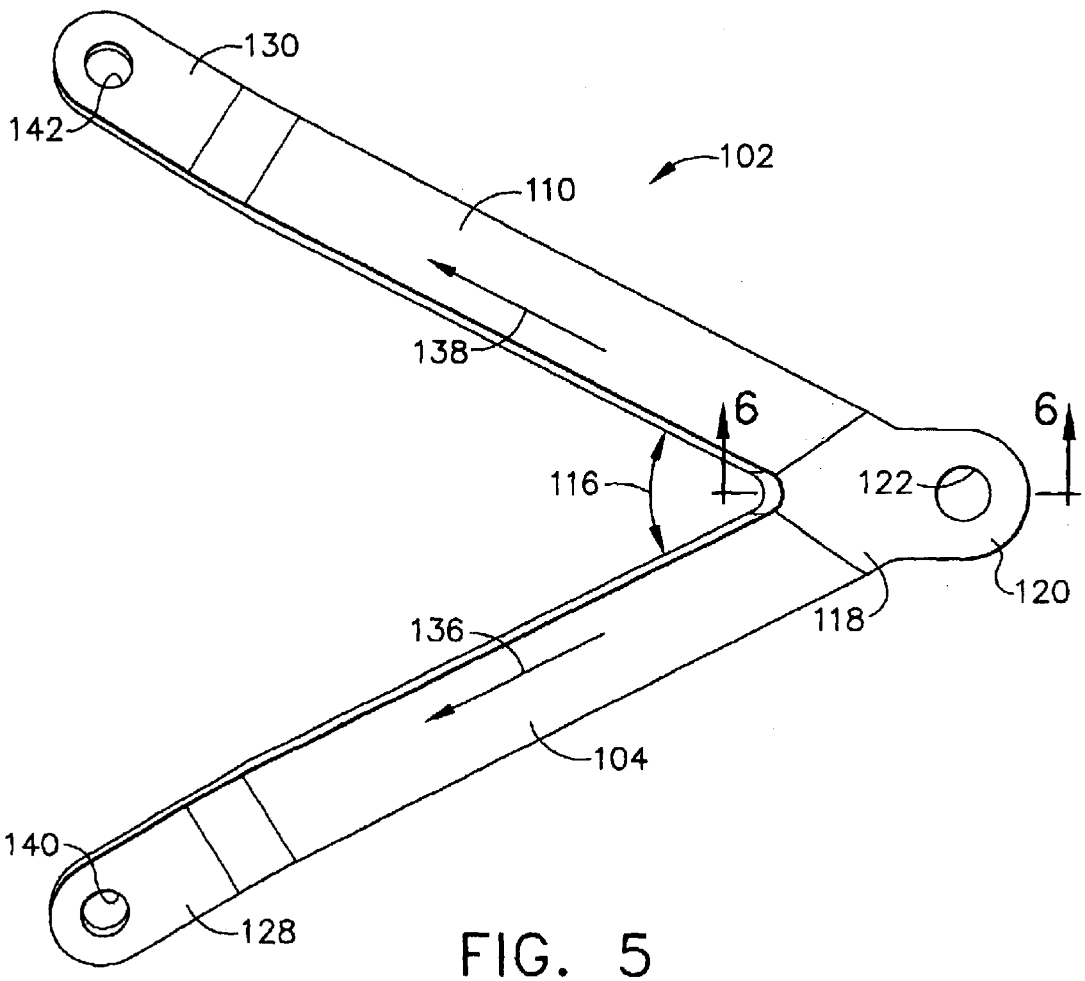
FIG. 5 is a top view of the support member depicted in FIG. 4.

As seen in FIG. 5, however, a device 94 is utilized to retain pin members 90 in openings 84 and partial openings 88. In particular, it will be understood that a flexible metal band 96 is preferably inserted within an annular groove portion 97 formed in inner support cone 34 which intersects each opening 84 in inner support cone 34 to provide a mechanical stop. It will be noted that band 96 is preferably continuous within annular groove portion 97 and is of sufficient length so as to overlap for at least a portion of the circumference therein. Band 96 also preferably has a width 98 which is sized to be retained within annular groove portion 97 of inner support cone 34.

Of course, partial openings 88 in inner liner aft end 82 are preferably sized so that pin members 90, and therefore inner support cone 34 and nozzle support 33, are able to slide radially with respect to inner liner aft end 82 as inner support cone 34 and nozzle support 33 experience thermal growth greater than inner liner 18. Accordingly, inner support cone 34 is able to move between a first radial position and a second radial position. Partial openings 88 may be substantially circular (when viewed from a bottom radial perspective) so as to permit only radial movement of pin members 90 and inner support cone 34, but preferably are ovular in shape so that a major axis thereof is aligned substantially parallel to longitudinal centerline axis 12. In this way, pin members 90, nozzle support 33 and inner support cone 34 are able to slide axially with respect to inner liner aft end 82 when thermal growth of nozzle support 33 and inner support cone 34 are greater than inner liner aft end 82. It will be appreciated then that nozzle support 33 and inner support cone 34 are also able to move between a first axial position and a second axial position. Partial openings 88 will also preferably have a circumferential length along a minor axis which is substantially the same as a diameter for openings 84 so that circumferential movement of inner support cone 34 and support nozzle 33 are discouraged. It will be understood that a length 92 of pin members 90, a depth 99 of partial openings 88, and an axial length 100 along the major axis of partial openings 88 will be sized so as to permit a desirable amount of thermal growth for nozzle support 33 and inner support cone 34.

It will further be noted that each pin member 90 may include a partial opening formed therein which includes threads along a sidewall thereof. This is provided so that there will be an easy way of retrieving pin member 90 once device 94 is removed. More specifically, a tool or other device may be threadably mated with such threads of the partial opening so that pin member 90 may be lifted out of opening 84 and partial opening 88.

Figure 4:
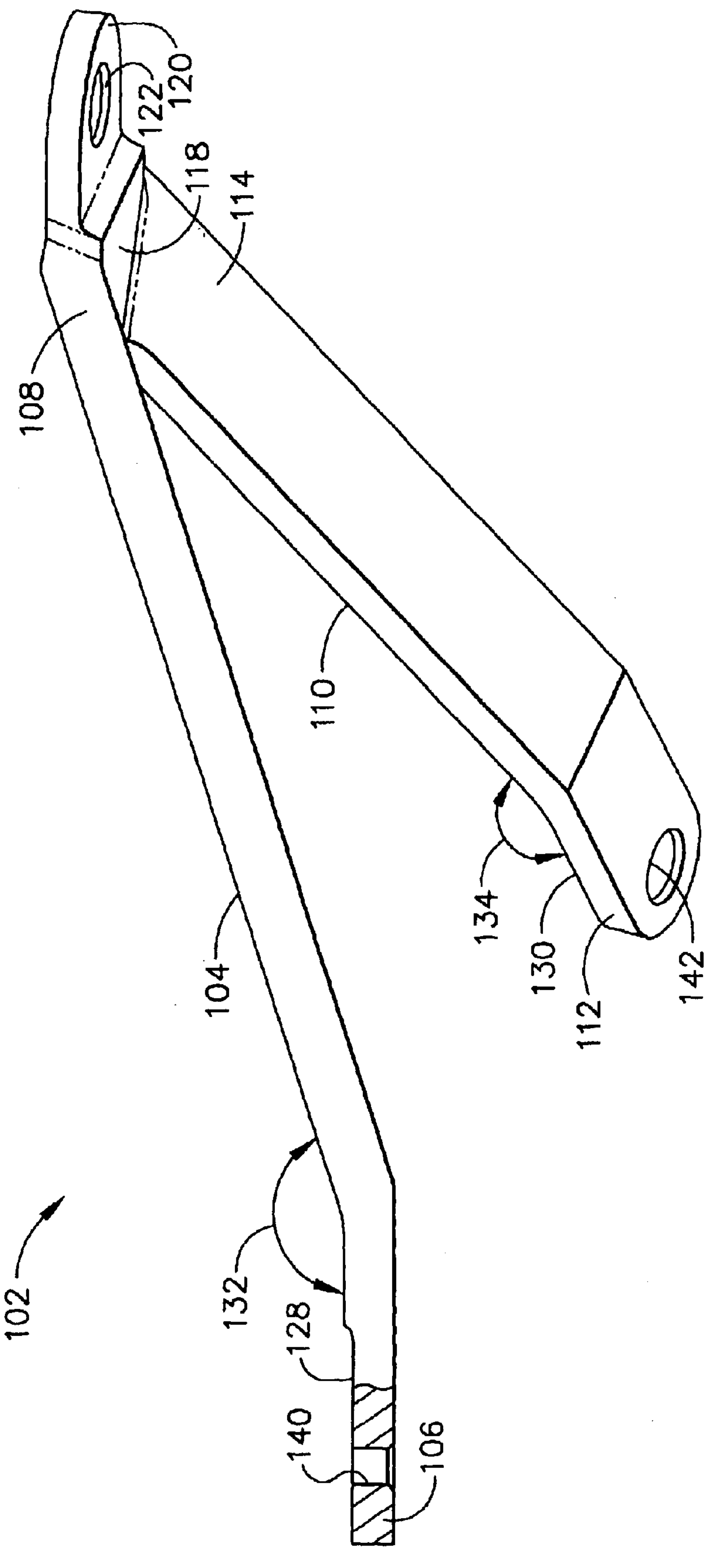
FIG. 4 is a perspective view of the support member depicted in FIG. 1.
Figure 6:
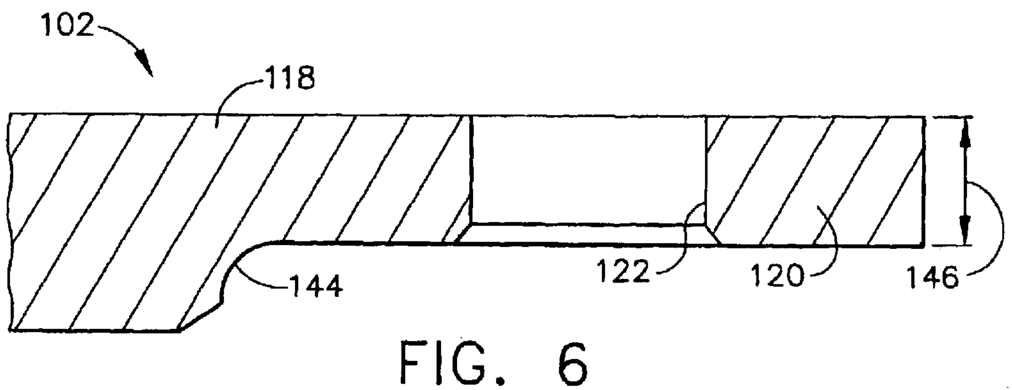
FIG. 6 is an enlarged, partial cross-sectional view of the support member taken along line 6—6 in FIG. 5.

In order to increase the stiffness of combustor 10, and thereby causing the vibration frequency thereof to be outside the operating frequency range of the gas turbine engine, a plurality of circumferentially spaced support members 102 (known as drag links) are preferably connected at an aft end to inner support cone 34 and extend axially forward to be movably connected at a forward portion with forward end 40 of inner liner 18 via mounting assembly 38. It will be understood from FIGS. 4 and 5 that each drag link 102 preferably is made of a nickel-based superalloy and has a wishbone-type shape. Each drag link 102 further includes a first portion 104 having a forward end 106 and aft end 108, as well as a second portion 110 having a forward end 112 and an aft end 114 which is oriented at a circumferential angle 116 to first portion 104. A common junction portion 118 is connected to aft ends 108 and 114 of first and second portions 104 and 110, respectively. An aft portion 120 of each drag link 102 extends from common junction portion 118. It will be appreciated that aft portion 120 includes an opening 122 therein so that it may be connected to inner support cone 34 via a bolt 124 and nut 126 (see FIG. 1). As best seen in FIG. 6, aft portion 120 of each drag link 102 preferably includes a step portion 144 from common junction portion 118 so that it has a reduced thickness 146.

It will further be seen that first and second drag link portions 104 and 110 each include a forward section 128 and 130, respectively, which preferably are oriented at a radial angle 132 and 134 to longitudinal axes 136 and 138 extending through such first and second portions 104 and 110. Forward sections 128 and 130 are preferably substantially parallel to inner liner forward end 40 (i.e., so as to be substantially perpendicular to an axis 53 of pin members 52 of mounting assembly 38) and include openings 140 and 142 therethrough. In accordance with mounting assembly 38, it will be appreciated that forward section 128 of first drag link portion 104 is positioned between bushing 64 and pin head portion 54. Similarly, although not shown, forward section 130 of second drag link portion 110 is positioned between bushing 64 and pin head portion 54 of an adjacent assembly. It will by appreciated that at least one assembly mounting inner liner 18 with inner dome portion 44 and inner cowl 26 will be positioned between each assembly including first and second forward sections 128 and 130 due to a circumferential angle 116 (on the order of approximately 10–30°) between first and second drag link portions 104 and 110. In this way, first and second drag link portions 104 and 110 are preferably movably connected to inner liner forward end 40 while being fixedly connected to inner cowl aft portion 42 and dome inner portion 44.

It will be appreciated that a method of providing additional stiffness to a gas turbine engine combustor is exhibited via drag links 102 described hereinabove. This method is particularly useful when the mounting assemblies 38 and 80 for the forward and aft ends 40 and 82, respectively, of inner liner 18 are configured to permit radial movement (e.g., utilized in the case where inner liner 18 is made of a material having a lower coefficient of thermal expansion than inner support cone 34 located adjacent thereto). The steps of such method preferably include movably connecting a plurality of drag links 102 at a forward portion to forward end 40 of inner liner 18 and fixedly connecting drag links 102 at an aft portion 120 to inner support cone 34. More particularly, such method may include the steps of fixedly connecting the forward portion of drag links 102 to inner cowl 26 and/or dome 20.

Having shown and described the preferred embodiment of the present invention, further adaptations of the drag link support member for a combustor having CMC liners can be accomplished by appropriate modifications by one of ordinary skill in the art without departing from the scope of the invention. In particular, it will be understood that such drag link support member may be altered or modified so as to better accommodate connection with the inner support cone and/or the inner liner.

What is claimed is:

1. A support assembly for a gas turbine engine combustor including an inner liner and an inner casing spaced therefrom, wherein a longitudinal centerline axis extends through said gas turbine engine, said support assembly comprising:

(a) an annular inner support cone located adjacent an aft end of said inner liner;

(b) an annular nozzle support connected to said inner support cone; and, (c) a plurality of support members connected at a first end to a forward end of said inner liner and connected at a second end to said inner support cone.

2. The support assembly of claim 1, wherein each said support member is substantially wishbone-shaped.

3. The support assembly of claim 1, wherein vibrations experienced by said combustor are outside the operating range of the gas turbine engine.

4. The support assembly of claim 1, each said support member further comprising:

(a) a first portion having a forward end and an aft end;

(b) a second portion having a forward end and an aft end, wherein said second portion is oriented at a circumferential angle to said first portion;

(c) a common junction portion connecting said first and second portions at said aft ends thereof; and (d) an aft portion extending from said common junction portion.

5. The support assembly of claim 4, said forward ends of said first and second portions of each said support member being movably connected to said inner liner forward end.

6. The support assembly of claim 4, said aft portion of each said support member being connected to said inner support cone.

7. The support assembly of claim 4, said forward ends of said first and second portions of each said support member being fixedly connected to a dome of said combustor.

8. The support assembly of claim 4, said forward ends of said first and second portions of each said support member being fixedly connected to an inner cowl of said combustor.

9. The support assembly of claim 4, said first and second portions of each said support member including a forward section oriented at a radial angle to a longitudinal axis through said respective first and second portions.

10. The support assembly of claim 9, wherein said forward sections of said first and second portions is oriented substantially parallel to said common junction portion.

11. The support assembly of claim 4, each said support member further comprising a radiused step portion between said common junction portion and said aft portion.

12. The support assembly of claim 1, wherein said inner liner is made of a ceramic matrix composite material.

13. The support assembly of claim 1, wherein said inner support cone is made of a metal.

14. The support assembly of claim 1, wherein said nozzle support is made of a metal.

15. The support assembly of claim 1, wherein said support members are made of a metal.

16. A combustor for a gas turbine engine having a longitudinal centerline axis extending therethrough, comprising:

(a) an inner liner having a forward end and an aft end, said inner liner being made of a ceramic matrix composite material;

(b) an inner casing spaced from said inner liner so as to form an inner passage therebetween;

(c) an annular inner support cone located adjacent to said inner liner aft end, said inner support cone being made of a metal; and, (d) a plurality of circumferentially spaced support members connected at a first end to said inner liner forward end and connected at a second end to said annular inner support cone;

wherein said support members provide additional stiffness to said combustor.

17. The combustor of claim 16, wherein each said support member is substantially wishbone-shaped.

18. The combustor of claim 16, wherein vibrations experienced by said combustor are outside the operating range of the gas turbine engine.

19. The combustor of claim 16, each said support member further comprising:

(a) a first portion having a forward end and an aft end;

(b) a second portion having a forward end and an aft end, wherein said second portion is oriented at a circumferential angle to said first portion;

(c) a common junction portion connecting said first and second portions at said aft ends thereof; and (d) an aft portion extending from said common junction portion.

20. The combustor of claim 19, said forward ends of said first and second portions of each said support member being movably connected to said inner liner forward end.

21. The combustor of claim 19, said aft portion of each said support member being connected to said inner support cone.

22. The combustor of claim 19, said forward ends of said first and second portions of each said support member being fixedly connected to a dome of said combustor.

23. The combustor of claim 19, said forward ends of said first and second portions of each said support member being fixedly connected to an inner cowl of said combustor.

24. The combustor of claim 19, said first and second portions of each said support member including a forward section oriented at a radial angle to a longitudinal axis through said respective first and second portions.

25. The combustor of claim 24, wherein said forward sections of said first and second portions are oriented substantially parallel to said inner liner forward end.

26. The combustor of claim 19, each said support member further comprising a radiused step portion between said common junction portion and said aft portion.

27. A method of providing additional stiffness to a gas turbine engine combustor, wherein an inner liner of said combustor is connected at a forward end and at an aft end in a manner permitting radial movement, comprising the following steps:

(a) movably connecting a plurality of support members at a forward portion to a forward end of said inner liner; and (b) fixedly connecting said support members at an aft portion to an annular inner support cone.

28. The method of claim 27, further comprising the step of fixedly connecting said first end of said support members to a dome of said combustor.

29. The method of claim 27, further comprising the step of fixedly connecting said first end of said support members to an inner cowl of said combustor.

* * * * *